Oct. 8, 1935.  F. H. ADAMS  2,016,570
TURNING MACHINE
Filed July 20, 1932  2 Sheets-Sheet 1

INVENTOR:
FRANK H. ADAMS
ATTORNEYS

Oct. 8, 1935.    F. H. ADAMS    2,016,570
TURNING MACHINE
Filed July 20, 1932    2 Sheets-Sheet 2

INVENTOR:
FRANK H. ADAMS
ATTORNEYS

Patented Oct. 8, 1935

2,016,570

UNITED STATES PATENT OFFICE 2,016,570

TURNING MACHINE

Frank H. Adams, Cleveland Heights, Ohio, assignor to The Cleveland Hobbing Machine Company, Cleveland, Ohio, a corporation of Ohio Application July 20, 1932, Serial No. 623,503

9 Claims. (Cl. 29—38)

The present invention relates to metal working machines and more particularly to turning machines of the multiple spindle type and has for an object the provision of a machine having a cylindrical form cutter, a plurality of work supports comprising head and tail stocks between which the work is adapted to be supported parallel to the axis of the cutter, and means for rotating the work and producing a relative translation thereof about the cutter.

Another object of the invention is the provision of a novel turning machine of the character referred to wherein the work pieces are loaded on rotatable spindles moved in a closed path about a cutter, at a point in said path referred to as the loading station and the forming operation performed as the spindles are carried in said path about the cutter and returned to the loading station.

Another object of the invention is the provision of a novel cutter having insertible blades.

Further objects and advantages of the invention will be apparent to those skilled in the art from the following description of the preferred embodiment of the invention described with reference to the accompanying drawings, in which.

Corresponding parts are indicated by similar reference characters throughout the several figures of the drawings.

Figure 1:
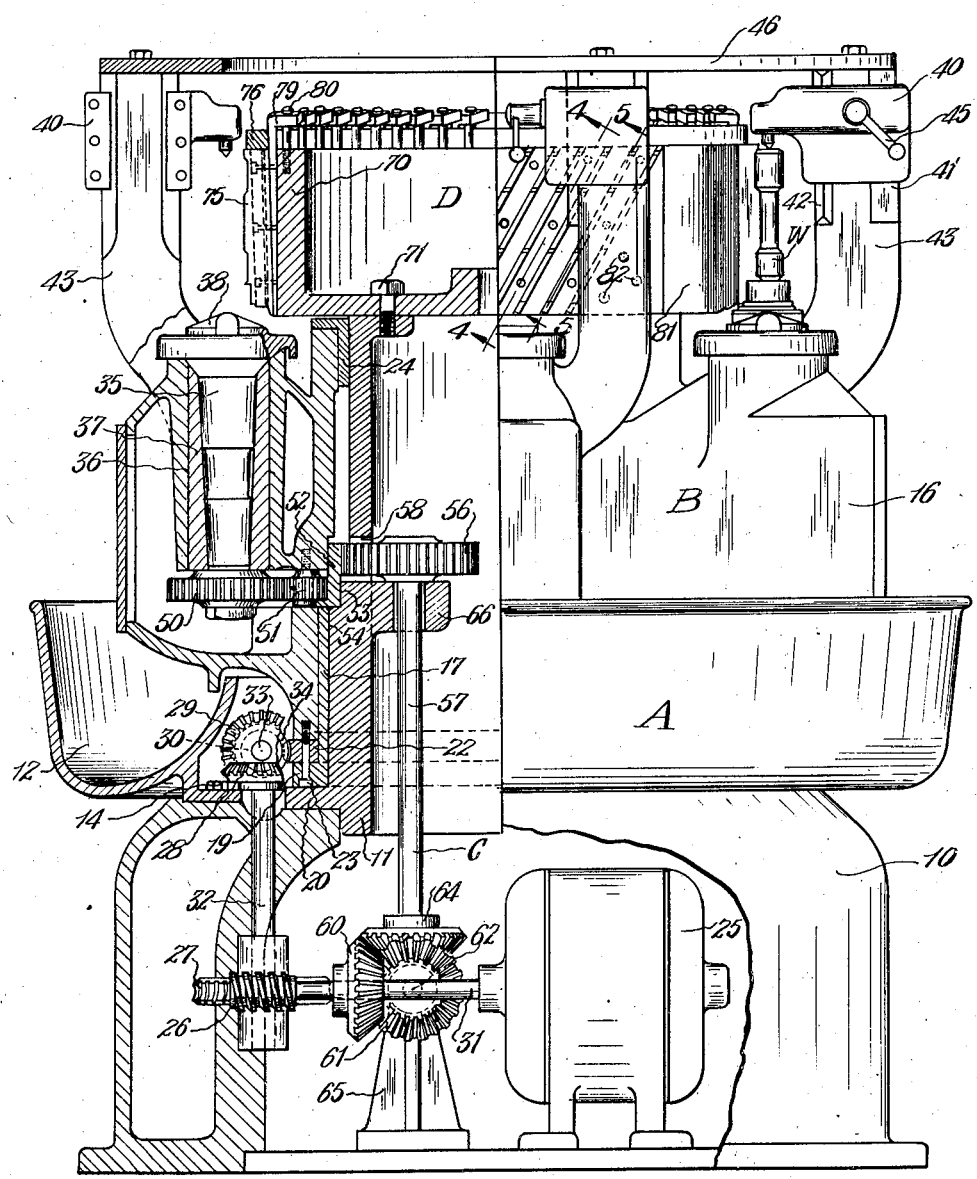
Fig. 1 is a section on the line 1—1 of Fig. 2 with portions shown in elevation.
Figure 2:
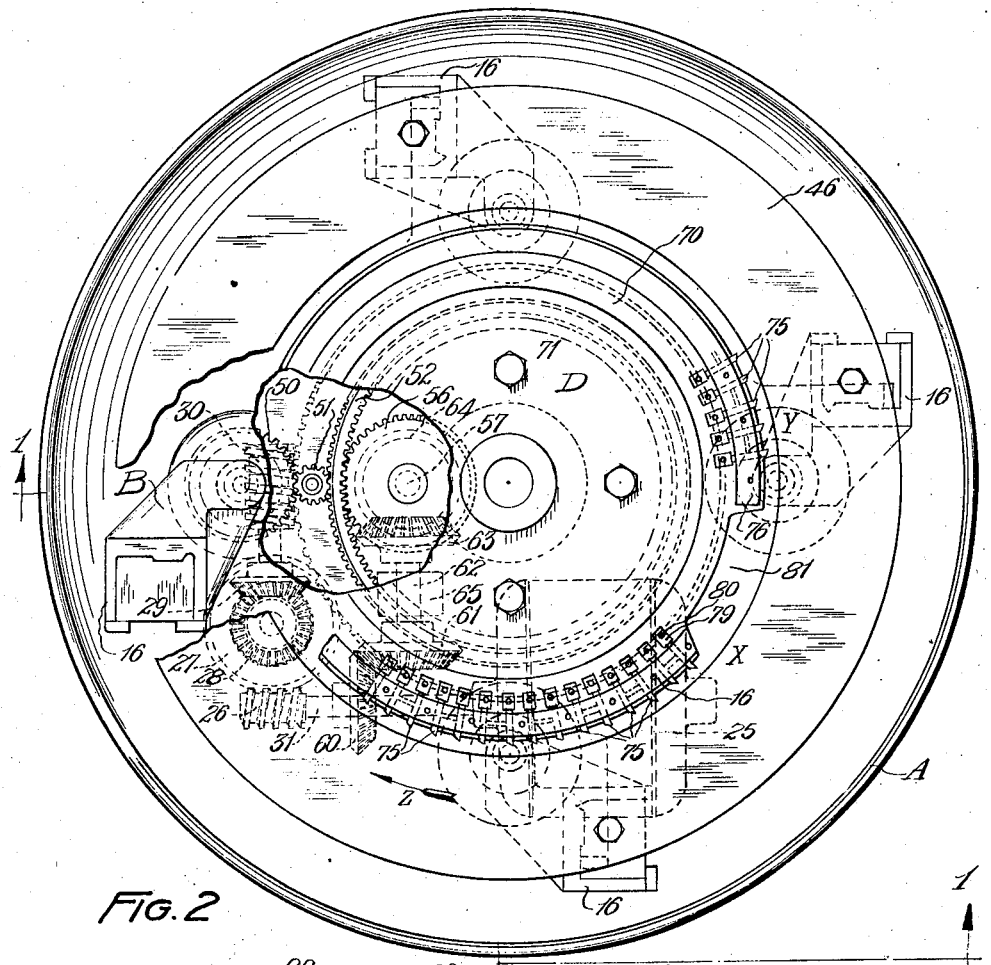
Fig. 2 is a top plan view of the machine shown in Fig. 1 with a portion broken away to show the interior construction.
Figures 3, 4, 5:
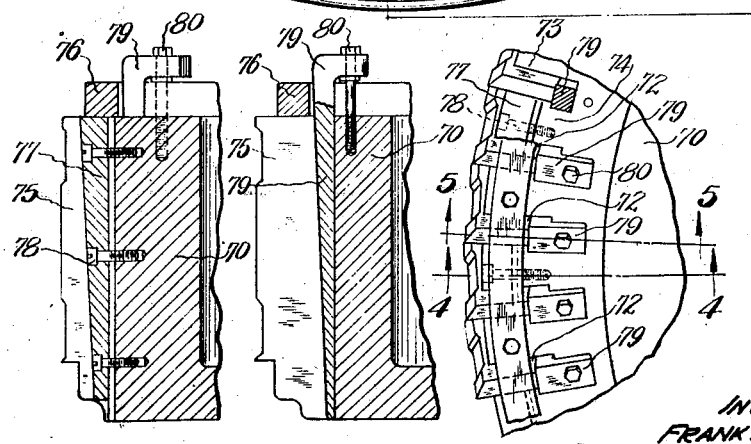
Fig. 3 is a plan view of a portion of the cutter.
Fig. 4 is a section on the line 4—4 of Figs. 1 and 3.
Fig. 5 is a section with portions in elevation on the line 5—5 of Figs. 1 and 3.

The preferred embodiment of the invention is illustrated in the drawings as applied to a four spindle machine comprising a frame A, a rotatable turret B, gearing C, and a tool or cutter D. The frame A comprises a base 10 adapted to be positioned on a floor space, etc., a central column 11 supported on the base 10 and adapted to be secured thereto by any suitable means, and a drip pan 12 adapted to receive the chips and coolant etc., secured to the base 10 by the bolts 14.

The turret B, comprising a frame member 16, is rotatably supported on the column 11 by an annular bearing 17 and a thrust bearing which takes the weight of the turret B in the form of an annular member 19 adapted to engage the top of a flange 20 on the column 11 secured, together with a worm gear 22, to the lower part of the frame member 16 by bolts 23 the heads of which are countersunk in the member 19. A wear plate 24 is interposed between the upper end of the frame member 16 and the column 11. The turret B is rotated on the column 11 by a motor 25 supported in the base 10 of the machine and operatively connected to the worm gear 22 through a worm and worm gear 26 and 27, miter or bevel gears 28 and 29, and a worm 30 in mesh with the worm gear 22, supported on an extension 31 of the armature shaft of the motor and shafts 32 and 33, respectively. The shafts 32 and 33 are rotatably supported in suitable bearings, not shown, in the base 11.

The frame member 16 of the turret B carries a plurality of head or work spindles 35 rotatably supported in apertures 36 formed in said frame member. Bearing sleeves 37 positioned in the apertures 36 surrounding the spindle 35 are adapted to take up wear, etc. in the spindles. The work spindles 35 are provided with chucks 38 of any suitable construction adapted to engage and support the lower ends of the work pieces W, one of which is illustrated. Tail stocks 40 slidably supported on ways 41 and 42 on projecting arms 43 formed integral with the frame member 16 engage and support the upper ends of the work pieces. Clamps 45 lock the tail stocks 40 to the arms 43 in any desired positions. An annular member 46 bolted to the top of the arm 43 increases the rigidity of the structure.

Spur gears 50 keyed to the lower end of the spindles 35 are in mesh with idler gears 51 which are in turn continuously in mesh with external teeth on a compound gear 52 rotatably supported on bearing surfaces 53 and 54 on the column 11. The internal teeth of the compound gear 52 are in mesh with a gear 56 keyed to a shaft 57 and projecting through a suitable opening 58 in the column 11. The gear 56 is driven by the motor 25 through the shaft 31, miter or bevel gears 60 and 61, shaft 62, and miter gears 63 and 64 keyed to shafts 62 and 57 respectively. The shaft 62 is supported in suitable bearings in the bracket 65.

From the foregoing description it will be apparent that the turret B carrying the work spindles 35, etc., may be rotated by the motor 25 through shaft 31, worm and worm gear 26 and 27, shaft 32, miter gears 28 and 29, shaft 33, and worm and worm gear 30 and 22, and at the same time the work spindles 35 rotate in the turret through the miter gears 60 and 61, shaft 62, miter gears 62 and 63, shaft 57, and gears 56, 52, 51 and 50. The relative speeds of the turret and spindles may be varied by changing the ratio of the gears in the gear trains illustrated or the gear trains illustrated may be supplemented by conventional change gears. Under some circumstances, the gear 52 may be supported integral with the column 11 and the spindle rotation produced by the movement or planetary action of the gears 51 as the turret rotates thereabout, but under most conditions this would not give a sufficiently high spindle speed for efficient operation of the machine.

The tool or cutter D comprises a cup-shaped member 70 supported on the top of the column 11 and detachably secured thereto as by the bolts 71. The outside cylindrical surface of the cup-shaped member 70 is provided with a plurality of spaced inclined slots 72 and alternate high and low projections 73 and 74 respectively. Cutter blades 75 are positioned in the slots 72 and held in place by tapered wedges 77 secured to the member 70 by bolts 78. A ring 76 bolted to the top of the member 70 and adapted to be engaged by the top of the blades 75 assists in locating said blades and retaining the same in position. A tapered gib 79 positioned behind each blade and adjustable in the slots 72 by a bolt 80 provides means for adjusting the blades 75 toward and from the center of the cutter. The blades are omitted for a portion 81 of the circumference of the cutter to permit loading and unloading of the work as the turret rotates. The reference character 82 designates a plurality of circular cutters employed for roughing out the corners of the work and these cutters may be positioned as desired.

The cutting edges of the blades 75 lie in a spiral; that is, the distance between the cutting edge and the axis about which the turret rotates increases from the point indicated by the reference character $x$ to the point $y$ in the direction of the arrow $z$. Because the cutting edges of the blades 75 lie in a spiral, a relative feeding movement between the tool and work is produced by the movement of the work about the tool or cutter produced by the rotation of the turret. The initial blades in the spiral, that is, the blades near the point $x$, may be roughing cutters, while the final blades are preferably finishing cutters.

In operation, the turret B is continuously rotated and the work spindles successively loaded and unloaded as they pass the portion 81 of the tool or cutter D where the blades are omitted. The work pieces are fed relative to the tool or cutter D and turned thereby as they are carried around the circumference thereof, and when they reach the loading station are removed in a finished condition.

The invention has been illustrated and described with reference to the preferred embodiment thereof, but it is to be understood that it may be embodied in numerous constructions. The number of work spindles may be varied as desired, and under some circumstances it may be desirable to rotate the tool or cutter instead of the spindle turret. I do not wish to be limited to the particular construction illustrated and described, and I particularly point out and claim as my invention:

I claim

1. A cutter comprising a cylindrical body portion having a plurality of inclined slots in a periphery thereof, a plurality of blades positioned in said slots with the cutting edges thereof lying in a spiral with reference to the longitudinal axis of the cylindrical body portion, means for securing said blades in said slots, and means for individually adjusting said blades radially of said body member.

2. A metal working machine comprising a frame, a work spindle rotatably supported by said frame, means for rotating said work spindle, a tail stock supported by said frame and adapted to cooperate with said work spindle for supporting a work blank, means for adjusting said tail stock towards and from said work spindle means for supporting a plurality of helically arranged cutting blades on said frame with the cutting edges thereof lying in a curved surface, means for individually adjusting said cutter blades, and means for producing relative movement between said work spindle and said cutting blades along an arcuate path whereby a feed movement is effected between said cutting blades and the axis of said spindle.

3. A metal working machine comprising a frame, a work spindle rotatably supported by said frame, means for rotating said work spindle, a tail stock supported by said frame and adapted to cooperate with said work spindle for supporting a work blank, means for adjusting said tail stock towards and from said work spindle means for supporting a plurality of helically arranged cutting blades on said frame with the cutting edges thereof lying in a curved surface, means for individually adjusting said cutter blades, and means for moving the axis of rotation of said work spindle in an arcuate path whereby a feeding movement is effected.

4. A metal working machine comprising a frame, a turret rotatably supported by said frame, a work spindle rotatably supported by said turret with its axis of rotation offset with reference to the axis of rotation of said turret, means for rotating said work spindle, a tail stock supported by said frame and adapted to cooperate with said work spindle for supporting a work blank, means for adjusting said tail stock towards and from said work spindle means for supporting a plurality of helically arranged cutting blades on said frame with the cutting edges thereof arranged in a spiral with reference to the axis of rotation of said turret, means for adjusting said cutter blades relative to said frame, and means for rotating said turret whereby a feed movement is effected between said work spindle and said cutting blades.

5. A metal working machine comprising a frame, a turret rotatably supported by said frame provided with a plurality of upstanding members, a plurality of work spindles rotatably supported by said turret with their axes of rotation offset with reference to the axis of rotation of said turret, means for rotating said work spindles, tail stocks supported by said upstanding members, means for adjusting said tail stocks towards and from said work spindles, means for connecting said upstanding members above said tail stocks, a member detachably supported by said frame, means for supporting a plurality of helically arranged cutting blades on said member with the cutting edges thereof arranged in a spiral with reference to the axis of rotation of said turret, means for individually adjusting said cutter blades relative to said member, and means for rotating said turret whereby said work spindles are successively moved past said cutting blades and a feed movement is effected between said work spindles and said cutting blades.

6. A metal working machine comprising a frame, a plurality of helically arranged individually adjustable cutting blades having radially outwardly projecting cutting edges arranged in a spiral supported by said frame, means for individually adjusting said blades radially with reference to the axis of said spiral, a work spindle rotatably supported by said frame, means for rotating said work spindle, and means for producing relative movement between said work spindle and said cutting blades about an axis normal to the plane of the spiral of said cutting edges whereby a feed movement is effected between said cutting blades and the axis of said spindle.

7. A metal working machine comprising a frame, a plurality of helically arranged individually adjustable cutting blades having radially outwardly projecting cutting edges arranged in a spiral supported by said frame, means for individually adjusting said blades radially with reference to the axis of said spiral, a work spindle rotatably supported by said frame, means for rotating said work spindle, and means for moving the axis of rotation of said work spindle in an arcuate path about an axis normal to the plane of the spiral of the cutting edges whereby a feed movement is effected between said spindle and said cutting blades.

8. A metal working machine comprising a frame, a turret rotatably supported by said frame, a work spindle rotatably supported by said turret with its axis of rotation offset with reference to the axis of rotation of the turret, means for rotating said work spindle, a plurality of helically arranged individually adjustable cutting blades on said frame having radially outwardly projecting cutting edges arranged in a spiral normal to the axis of rotation of said turret, means for individually adjusting said blades radially with reference to the axis of said spiral and means for rotating said turret whereby a feed movement is effected between said work spindle and said cutting blades.

9. A metal working machine comprising a frame, a turret rotatably supported by said frame, a plurality of work spindles rotatably supported by said turret with their axes of rotation offset with reference to the axis of rotation of said turret, means for rotating said work spindles, a member detachably supported by said frame, means for supporting a plurality of helically arranged individually adjustable cutting blades having radially outwardly projecting cutting edges arranged in a spiral with reference to the axis of rotation of said turret supported by said frame, means for individually adjusting said blades radially with reference to the axis of said spiral and means for rotating said turret whereby said work spindles are successively moved past said cutting blades and a feed movement effected between said work spindles and said cutting blades.

FRANK H. ADAMS.